March 6, 1962     H. B. SCHULTZ     3,023,997
ACCUMULATOR CHARGING VALVE
Filed Sept. 23, 1957
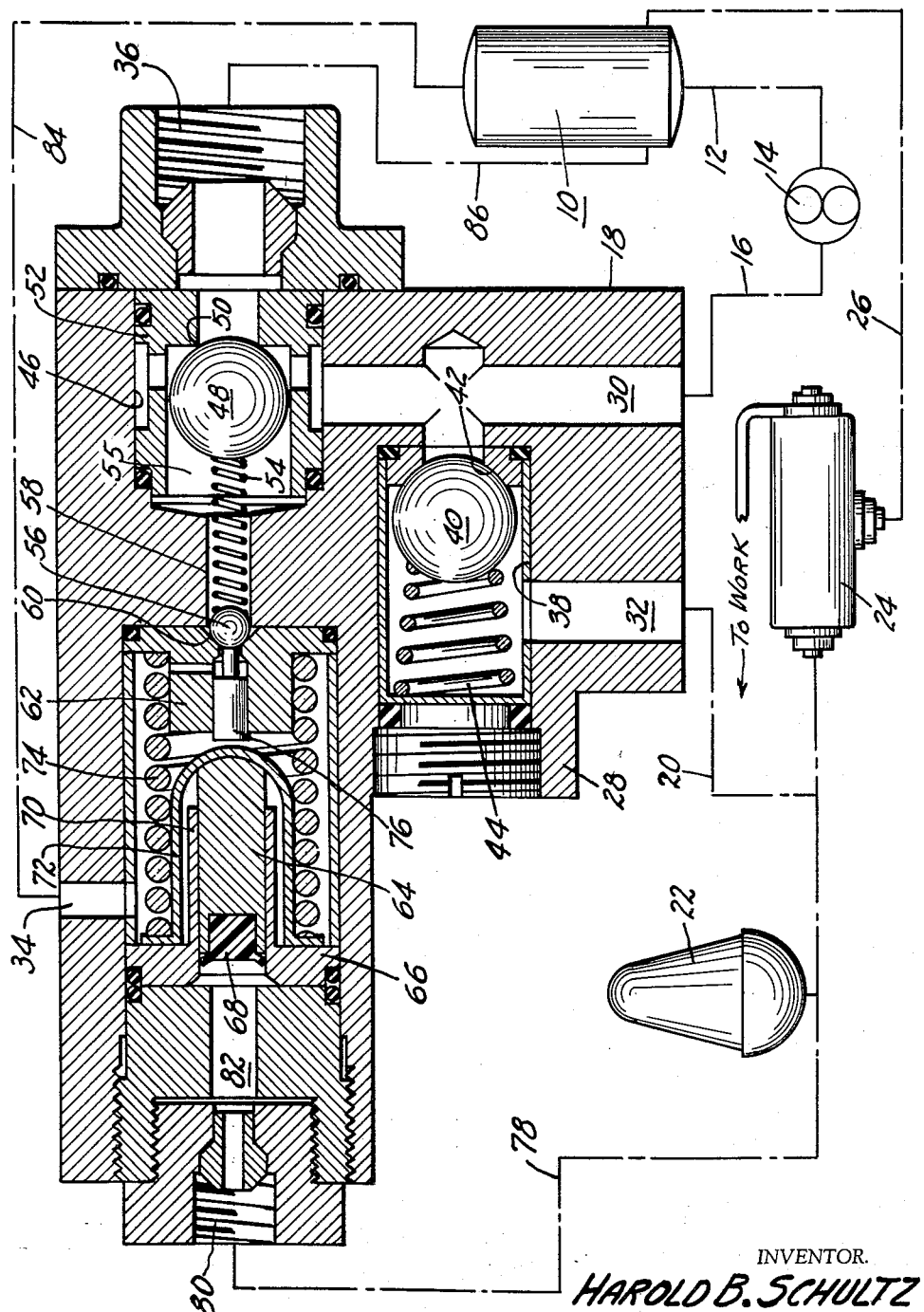
INVENTOR.
*HAROLD B. SCHULTZ*
BY
*William N. Antonis*
ATTORNEY

United States Patent Office 3,023,997
Patented Mar. 6, 1962

3,023,997
ACCUMULATOR CHARGING VALVE
Harold B. Schultz, South Bend, Ind., assignor to The Bendix Corporation, a corporation of Delaware
Filed Sept. 23, 1957, Ser. No. 685,658
2 Claims. (Cl. 251—28)

This invention relates to an automotive central hydraulic system and more particularly to a charging valve for an accumulator in such a system.

In central hydraulic systems which involve the operation of numerous hydraulic devices, it is essential, for efficient and satisfactory operation of the hydraulic devices, that fluid be instantly available at all times within close limits of the desired operating or peak pressure for which the system is designed. The demand for hydraulic fluid by these devices may fluctuate widely during comparative periods, and for long time intervals there may be negligible or no demand at all. In order to compensate for such wide fluctuations such systems may utilize an accumulator which pressurizes fluid by means of a quantity of confined compressed gas. At times of peak demand such an accumulator serves as an auxiliary to the pump to supply additional fluid when needed and also serves to balance out undesirable variations in pressure. In order to maintain the hydraulic pressure in the accumulator within predetermined limits, a charging valve is utilized to charge the accumulator when a certain amount of fluid has been withdrawn from the accumulator and to deliver the fluid from the pump directly back to the reservoir when the pressure in the accumulator reaches the desired high limit.

It is an object of this invention to provide such a charging valve which will operate in an efficient, quiet, and effective manner.

Another object of this invention is to provide a charging valve which is relatively inexpensive to manufacture since only simple machining operations will be required and few parts will be necessary which need be held within close limits of dimension and concentricity.

A further object of this invention is to provide a charging valve having a pilot valve and a by-pass valve therein which utilizes two separate return ports, one associated with each of said valves, in order to eliminate pilot valve instability and chatter resulting from momentary back pressure surges which occur when fluid flow is diverted from the accumulator to the reservoir by opening of the by-pass valve.

A still further object of this invention is to provide a charging valve which utilizes a ball type by-pass valve movable in a bore, wherein a clearance is provided between said ball valve and bore wall to permit both sides of said ball valve to be subjected to inlet pressure.

Another object of this invention is to provide a simple compact charging valve having a minimum number of parts which will be operable at the desired limits of pressure.

The above and other objects and features of the invention will be apparent from the following description of the device taken in connection with the accompanying drawing which forms a part of this specification, and in which the single FIGURE illustrates a hydraulic system into which my charging valve has been incorporated.

The hydraulic system shown in the drawing includes a reservoir 10 connected by a conduit 12 to a pump 14 which transmits fluid to the system via conduit 16 and charging valve 18. A conduit 20 connects the charging valve 18 to an accumulator 22 or to various hydraulically operated devices which may be controlled by a valve or valves as indicated at 24. Valve or valves 24 may be of any type known in the art which will permit fluid to pass from line 20 to the work, or return fluid from the work to the reservoir 10 through a conduit 26.

The charging valve comprises a housing 28 having an inlet port 30, an accumulator port 32, and two return ports 34 and 36. A bore 38 communicates with inlet port 30 and accumulator port 32 and contains a ball check valve 40 which is urged against valve seat 42 by spring 44. Check valve 40 prevents reverse flow of fluid from the accumulator port 32 to inlet port 30. A second bore 46 communicates with the inlet port 30 and the two return ports 34 and 36 and contains a by-pass ball valve 48 seatable on valve seat 50 formed in bushing 52. This ball valve diameter is such that two to four thousandths of an inch clearance is provided between the ball and the cylindrical wall of the bushing so that fluid will flow to the left of the ball valve. The ball valve is normally urged against valve seat 50 by a spring 54 and the pressures exerted against the ball valve, since the effective area on the left side of the ball valve subject to inlet pressure is greater than the effective area on the right side of the ball valve subject to inlet pressure. A ball type pilot valve 56 is located in a reduced portion 58 of bore 46 and is seatable on valve seat 60 formed on bushing 62. Pilot valve 56 is urged against its valve seat by spring 54 which also urges by-pass valve 48 against its associated valve seat.

Also located in bore 46 is a pressure sensitive plunger 64 which is slidable within a bushing 66. The end of the plunger is sealed by a molded flanged plug 68 made of Teflon which is a resilient packing material characterized by low friction. Surrounding the extension 70 of bushing 66 is a cup-shaped retainer 72 which confines spring 74 and assists, along with extension 70, in preventing spring 74 from cocking to one side or the other of the bore when plunger 64 moves to the right. By keeping the spring in substantially straight alignment a more accurate response is provided. Between cup-shaped retainer 72 and pilot valve 56 is a pin 76 which is slidable within bushing 62. Thus movement of plunger 64 will cause the pilot valve to be unseated from valve seat 60. Such movement will occur when a predetermined accumulator pressure is transmitted to the plunger via conduit 78, accumulator pressure sensing port 80, and passage 82.

Return port 34 communicates directly with reservoir 10 via conduit 84, and return port 36 communicates with the reservoir by a separate conduit 86. By using two return ports with separate conduits to the reservoir, the ill effects of back pressure on the pilot valve are minimized.

The operation of the charging valve just described is as follows: Assuming that the system is at no residual pressure, for example having for some reason been vented to atmosphere, the first action taking place upon the operation of the pump 14 is the passing of fluid from the pump to inlet port 30.

With by-pass ball valve 48 seated on valve seat 50, the pressure build-up at inlet port 30 will cause ball check valve 40 to move away from valve seat 42, so that fluid under pressure may flow from the inlet port to the accumulator port 32 and thence to the accumulator 22 or through the control valve or valves 42 to the various hydraulically operated devices. When the accumulator is sufficiently charged, that is when the pressure in the accumulator has reached the desired limit, the charging valve 18 will divert the flow from the pump back to the reservoir in the following manner. Accumulator pressure is communicated to the left side of plunger 64 via conduit 78, port 80, and passage 82 so that when a predetermined accumulator pressure is reached, this pressure acting on Teflon seal 68 exerts a force to the right great enough to overcome the opposing forces of springs 74 and 54 and the hydraulic pressure on valve seat 60 thereby causing pilot valve 56 to be unseated due to movement of the plunger 64, cup-shaped retainer 72 and pin 76 to the right. Opening of pilot valve 56 permits the exhaust of the pressurized fluid in chamber 55 through return port 34, thus relieving the pressure exerted on the left of the by-pass valve 48. With the pressure in chamber 55 thus relieved and no longer tending to hold ball 56 on its seat 60 to oppose the pressure on piston 64, the piston is then urged to its extreme right position bottoming through spring cage 72 against bushing 62. When this occurs the inlet pressure exerted against the effective area on the right side of the by-pass valve will be sufficient to move the valve away from valve seat 50, thereby by-passing fluid from the pump 14 directly back to the reservoir 10. Of course fluid will continue to flow through the annular passage formed by the clearance between by-pass ball valve 48 and the bore to chamber 55, but since the effective flow area of the annular passage is less than the effective flow area defined by pilot valve seat 60, the pressurized fluid can escape more freely than it can enter. Consequently, the pressure in chamber 55 will decrease, thereby permitting by-pass valve 48 to open as described above. By proper proportioning of these effective flow areas, the opening of by-pass valve 48 may be made slow enough so as to aid in the elimination of hydraulic hammer effects caused by the sudden rush of fluid under high pressure into a space containing fluid at low pressure. Furthermore by using two return ports 34 and 36 and separate conduit connections to the reservoir it is possible to prevent back pressures which would cause undesirable effects on the pilot valve 56. If only one return port were provided, then, when fluid flow is diverted from the accumulator port to the return port by opening of the by-pass valve, the momentary pressure surge which would occur would be reflected in chamber 55 as back pressure via open pilot valve 56 causing instability and chatter of the pilot valve. Such instability of course would affect consistant performance of the charging valve.

When the various hydraulically operated devices connected to the fluid pressure system are opearted, the pressure in the accumulator may have reached a predetermined low limit at which time, the charging valve 18 will divert the flow from the pump back to the accumulator in the following manner. When the accumulator pressure reaches a predetermined low, the force exerted against plunger 64 will be insufficient to overcome springs 74 and 54 and the plunger 64 and retainer 72 will have returned to their original neutral positions, thereby permitting spring 54 to return pilot valve 56 to its valve seat 60. Pressure will therefore begin to build up in chamber 55 and will exert a force against the left side of by-pass valve 48. This force supplemented by the force of spring 54 will cause the by-pass valve to seat on valve seat 50, thereby preventing further flow to the reservoir 10. The resulting pressure build-up at the inlet port 30 will then cause ball check valve 40 to open and permit flow to accumulator 22.

The several practical advantages which flow from this charging valve construction are believed to be obvious from the above, and other advantages may suggest themselves to those who are familiar with the art to which this invention relates.

Having thus described the various features of the invention, what I claim as new and desire to secure by Letters Patent is:

1. A valve assembly of the class described comprising a housing having an inlet port, two return ports and a pressure sensing port, a bore communicating with said inlet, return and pressure sensing ports, a first valve seat formed at one end of said bore and in one of said return ports, a second valve seat located in said bore between said inlet port and the other of said return ports, a first ball valve located in said bore and seatable on said first valve seat, a second ball valve located in said bore and seatable on said second valve seat, a chamber formed in said bore between said first and second ball valves, a spring located in said chamber for urging both of said first and second ball valves against their associated valve seats, said first ball valve when seated having two opposed unequal surface areas, the larger of which is subjected to chamber pressure and the smaller of which is subjected to inlet pressure, annular passage means formed by the surface of said first ball valve and the wall of said bore for permitting a limited amount of flow from said inlet port to said chamber, said annular passage means having a smaller effective flow area than the flow area defined by said second valve seat, a bushing having an extension formed thereon located in said bore, a plunger slidable within said bushing and said extension, said plunger having one end thereof communicating with said pressure sensing port, a cup-shaped retainer surrounding said extension and in contact with the other end of said plunger, and a spring surrounding said retainer and in contact therewith for opposing movement of said plunger and retainer, said plunger and retainer moving at a predetermined control pressure to unseat said second ball valve thereby relieving the pressure in said chamber, said relief of pressure creating a pressure differential across said first ball valve to cause same to move away from said first valve seat thereby permitting fluid flow between said inlet port and one of said return ports.

2. A valve assembly of the class described comprising a housing having an inlet port, two return ports and a pressure sensing port, a bore communicating with said inlet, return and pressure sensing ports, a first valve seat located in said bore between said inlet port and one of said return ports, a second valve seat located in said bore between said inlet port and the other of said return ports, a first valve located in said bore and seatable on said first valve seat, a second valve located in said bore and seatable on said second valve seat, a chamber formed in said bore between said first and second valves, spring means located in said chamber for urging said first and second valves against their associated valve seats, said first valve when seated having two opposed unequal surface areas, the larger of which is subjected to chamber pressure and the smaller of which is subjected to inlet pressure, passage means for permitting a limited amount of flow from said inlet port to said chamber, said passage means having a smaller effective flow area than the flow area defined by said second valve seat, a bushing having an extension formed thereon located in said bore, a plunger slidable within said bushing and said extension, said plunger having one end thereof communicating with said pressure sensing port, a cup-shaped retainer surrounding said extension and in contact with the other end of said plunger, and a spring surrounding said retainer and in contact therewith for opposing movement of said plunger and retainer, said plunger and retainer moving at a predetermined control pressure to unseat said second valve thereby relieving the pressure in said chamber, said relief of pressure creating a pressure differential across said first valve to cause same to move away from said first valve seat thereby permitting fluid flow between said inlet port and one of said return ports.

References Cited in the file of this patent
UNITED STATES PATENTS

| | | |
|---|---|---|
| 500,994 | Curtis | July 4, 1893 |
| 767,849 | Stillman | Aug. 16, 1904 |
| 2,393,571 | Schultz | Jan. 22, 1946 |
| 2,420,890 | MacDuff | May 20, 1947 |
| 2,447,820 | Schultz | Aug. 24, 1948 |
| 2,649,115 | Deardorff | Aug. 18, 1953 |
| 2,807,274 | Evans | Sept. 24, 1957 |